UNITED STATES PATENT OFFICE.

ALBERT WILHELM REHNSTRÖM, OF MÄLHAMMAR, SWEDEN.

SOAP.

SPECIFICATION forming part of Letters Patent No. 476,557, dated June 7, 1892.

Application filed January 16, 1892. Serial No. 418,312. (No specimens.) Patented in Sweden November 28, 1889, No. 2,290; in England May 20, 1890, No. 7,854; in France September 15, 1890, No. 205,854, and in Canada May 9, 1891, No. 36,560.

*To all whom it may concern:*

Be it known that I, ALBERT WILHELM REHNSTRÖM, a subject of the King of Sweden and Norway, residing at Mälhammar, Rekarne, Sweden, have invented certain new and useful Improvements in the Manufacture of Soap, (for which I have received Letters Patent in Sweden, dated November 28, 1889, No. 2,290; in France, dated September 15, 1890, No. 205,854; in England, dated May 20, 1890, No. 7,854, and in Canada, dated May 9, 1891, No. 36,560;) and I declare the following to be a full, clear, and exact description of the same.

In the manufacture of soap it has been proposed to add to the fat to be saponified or to the prepared soap mass one or more of several substances specially adapted for the human skin and, in addition to being a cleaning agent, make the skin soft and smooth, remove sunburn, allay irritations, &c. It has also been proposed to saponify fatty constituents of milk, in combination with the saponifiable substances, to form the soap mass, with the result that the soap was clarified and capable of producing a good lather.

The present invention consists in adding milk (more or less concentrated) to a previously-saponified soap mass, to the end that the resultant article will contain the properties peculiar to the milk, which are capable of such beneficial effect on the skin.

In practicing my invention I may use either skimmed or unskimmed milk. The milk, with its natural constituents, is placed in suitable vessels and subjected to an evaporating process until the resultant product has reached a dry state, attained the consistency of porridge, or has reached any intermediate stage. This concentrated milk is then ready for combination with the previously-prepared soap mass. This latter is produced by saponification in the usual manner by boiling a suitable fatty element with an alkali. As a fatty element, I may use cocoanut-oil, palm-oil, tallow, milk-fat, or other fatty element suitable for the preparation of soap, and as an alkali soda or potash lye may be employed. Soda-lye is used if the production of solid soap is desired and potash lye if a soft or liquid soap is to be produced. The saponification may be effected in any well-known manner, and the proportions of the principal ingredients may vary, according to circumstances and requirements. Twenty-two per cent. of cocoanut-oil, 4.5 per cent. of caustic soda, and 73.5 per cent. water are proportions that will give good results. As the milk to be added to the soap mass contains a fatty element to a greater or less degree, the soap mass should contain an excess of alkali to secure the saponification of the said fatty element of the milk. My improved soap article is then produced in the following manner: After the sub-lye has been removed from the soap mass the concentrated milk is added under constant stirring to the soap mass, the proportion of concentrated milk being in about the proportion of twenty-five per cent. of the weight of the soap mass, although the proportion may be varied. When the stirring has converted the soap and milk into a homogeneous mass, the latter is permitted to cool and is then worked between rollers until it reaches a uniform condition. During the latter operation coloring-matter, perfume, or both, may be introduced, if desired. When the said mass has become cooled and reached the desired consistency, it may be molded or otherwise prepared for commercial purposes. If the soap mass is liquid, the mass is rendered homogeneous by stirring while the concentrated milk is added. The concentrated milk can be added to the soap mass after the latter has become cooled and broken and, if necessary, reheated to rather a low degree and again subjected to rollers, after which it is prepared for market.

I claim—

1. The herein-described process of making soap, consisting in adding concentrated milk to a previously-saponified soap mass and combining to secure a homogeneous soap product, substantially as set forth.

2. A soap containing concentrated milk as an element, substantially as set forth.

In witness whereof I have hereunto signed my name in the presence of two subscribing witnesses.

ALBERT WILHELM REHNSTRÖM.

Witnesses:
ERNST SVANQVIST,
E. HERMANSSON.